(12) United States Patent
Watabe (10) Patent No.: US 11,919,093 B2
(45) Date of Patent: Mar. 5, 2024

(54) MACHINE TOOL

(71) Applicants: CITIZEN WATCH CO., LTD., Nishitokyo (JP); CITIZEN MACHINERY CO., LTD., Nagano (JP)

(72) Inventor: Shuichi Watabe, Fujimino (JP)

(73) Assignees: CITIZEN WATCH CO., LTD., Nishitokyo (JP); CITIZEN MACHINERY CO., LTD., Nagano (JP)

( * ) Notice: Subject to any disclaimer, the term of this patent is extended or adjusted under 35 U.S.C. 154(b) by 387 days.

(21) Appl. No.: 17/277,847

(22) PCT Filed: Sep. 24, 2019

(86) PCT No.: PCT/JP2019/037382
§ 371 (c)(1),
(2) Date: Mar. 19, 2021

(87) PCT Pub. No.: WO2020/075490
PCT Pub. Date: Apr. 16, 2020

(65) Prior Publication Data
US 2021/0346964 A1  Nov. 11, 2021

(30) Foreign Application Priority Data

Oct. 10, 2018  (JP) ................. 2018-191537

(51) Int. Cl.
*B23Q 41/02* (2006.01)
*B23B 3/30* (2006.01)
*B23B 7/06* (2006.01)

(52) U.S. Cl.
CPC ............... *B23B 3/30* (2013.01); *B23B 7/06* (2013.01); *B23Q 41/02* (2013.01)

(58) Field of Classification Search
CPC .. B23Q 39/048; B23Q 39/024; B23Q 39/025; B23Q 39/027; B23Q 2220/002;
(Continued)

(56) References Cited

U.S. PATENT DOCUMENTS 4,612,832 A * 9/1986 Ushigoe ................ B23B 3/167
82/129
5,127,140 A * 7/1992 Oiwa .................... B23Q 39/048
700/169

(Continued)

FOREIGN PATENT DOCUMENTS

| CN | 106470785 A | 3/2017 |
|---|---|---|
| EP | 0310219 A2 | 4/1989 |

(Continued)

OTHER PUBLICATIONS

May 25, 2022, the Extended European Search Report issued by the European Patent Office in the corresponding European Patent Application No. 19871435.4.
(Continued)

*Primary Examiner* — Nicole N Ramos
(74) *Attorney, Agent, or Firm* — KENJA IP LAW PC (57) ABSTRACT

A machine tool includes a plurality of modules, and a control means for controlling operation of the modules, wherein the plurality of modules include a fixed module and two movable modules. The control means includes a restriction means for restricting the movement of the two movable modules for allowing only one of the movable modules to be moved to a facing position facing the fixed module; and a determination means for determining the movable module to be moved to the facing position. The control means is configured to control the operation of the plurality of modules so that, when the operation under cooperation of the fixed module and one of the movable modules has been completed, the restriction means releases the restriction of
(Continued)

the movement of the other movable module to the facing position.

3 Claims, 5 Drawing Sheets

(58) Field of Classification Search
CPC ........ B23Q 2230/006; B23Q 2039/008; B23B 3/30; B23B 3/32; B23B 13/04; B23B 13/121
See application file for complete search history.

(56) References Cited

U.S. PATENT DOCUMENTS

| | | | | |
|---|---|---|---|---|
| 6,675,451 | B1 * | 1/2004 | Miyano | B23Q 39/048 29/27 R |
| 6,742,422 | B1 * | 6/2004 | Shinohara | B23Q 39/04 82/47 |
| 6,971,294 | B1 * | 12/2005 | Shinohara | B23Q 39/048 82/47 |
| 7,367,929 | B2 * | 5/2008 | Feinauer | B23Q 39/028 409/172 |
| 8,224,477 | B2 * | 7/2012 | Matsumoto | B23Q 39/04 82/120 |
| 9,266,210 | B2 * | 2/2016 | Ando | B23Q 1/015 |
| 2003/0029286 | A1 * | 2/2003 | Kumano | B23B 3/30 82/121 |
| 2004/0211301 | A1 * | 10/2004 | Kobayashi | B23B 3/168 82/129 |
| 2015/0018179 | A1 * | 1/2015 | Scheffler | B23Q 3/1554 483/22 |
| 2017/0136547 | A1 | 5/2017 | Nakaya et al. | |

FOREIGN PATENT DOCUMENTS

| | | | |
|---|---|---|---|
| EP | 0573678 | A1 | 12/1993 |
| EP | 3162476 | A1 * | 5/2017 .............. B23B 3/06 |
| GB | 2262061 | A * | 6/1993 .............. B23B 3/30 |
| JP | S5321056 | A | 2/1978 |
| JP | 2002268715 | A | 9/2002 |
| KR | 1020170021348 | A | 2/2017 |
| WO | 2008016069 | A1 | 2/2008 |
| WO | 2014065123 | A1 | 5/2014 |
| WO | 2016002589 | A1 | 1/2016 |

OTHER PUBLICATIONS

Dec. 10, 2019, International Search Report issued in the International Patent Application No. PCT/JP2019/037382.
Jun. 20, 2022, Office Action issued by the Taiwan Intellectual Property Office in the corresponding Taiwanese Patent Application No. 108136241.
Apr. 8, 2021, International Preliminary Report on Patentability issued in the International Patent Application No. PCT/JP2019/037382.
Sep. 28, 2021, Notification of Reasons for Refusal issued by the Japan Patent Office in the corresponding Japanese Patent Application No. 2018-191537.
Mar. 21, 2023, Office Action issued by the Korean Intellectual Property Office in the corresponding Korean Patent Application No. 10-2021-7007381.
Apr. 12, 2022, Notification of Reasons for Refusal issued by the Japan Patent Office in the corresponding Japanese Patent Application No. 2018-191537.
May 30, 2023, Office Action issued by the China National Intellectual Property Administration in the corresponding Chinese Patent Application No. 201980059639.8.
Nov. 10, 2023, Office Action issued by the China National Intellectual Property Administration in the corresponding Chinese Patent Application No. 201980059639.8.

* cited by examiner

MACHINE TOOL

TECHNICAL FIELD

This disclosure relates to a machine tool.

BACKGROUND

Conventionally, there is known a machine tool that includes a workpiece holder means for holding a workpiece, a plurality of modules for performing predetermined processing on the workpiece, and a control means for controlling the operation of the modules, wherein the plurality of modules are comprised of a fixed module that is immovable in the X-axis direction that is orthogonal to the Z-axis, and two movable modules that are movable in the X-axis direction and the Z-axis direction, respectively, and adapted to be arranged in parallel with each other on the opposite sides of the fixed module to face the fixed module (see, for example, PTL 1).

The machine tool having the above-mentioned configuration may be used such that one movable module performs a predetermined processing on the workpiece, the workpiece is then delivered to the fixed module, the fixed module then performs a predetermined processing on the workpiece, and workpiece is transferred to the other movable module to perform a next processing.

CITATION LIST

Patent Literature

PTL 1: WO2016/002589A

SUMMARY

Technical Problem

In the machine tool described in PTL 1, both of the two movable modules may be simultaneously moved relative to the fixed module, to the positions facing the fixed module. Thus, when the workpiece is transferred between the movable modules and the fixed module, it is desired to control the two movable modules so as to smoothly move to the positions facing the fixed modules.

The present disclosure has been made in view of the above-mentioned problem, and it is an object of the present disclosure to provide a machine tool capable of smoothly moving two movable modules to positions facing the fixed module.

Solution to Problem

According to the present disclosure, there is provided a machined tool that comprises: a workpiece holder means for holding a workpiece; a plurality of modules for performing a predetermined processing on the workpiece; and a control means for controlling the operation of the plurality of the modules. The plurality of the modules comprises: a fixed module that is movable in a first direction and immovable in a second direction orthogonal to the first direction; and two modules that are movable in the first direction and the second direction and adapted to be arranged in parallel with each other on opposite side of the fixed module so as to face the fixed module. The control means comprises: a restriction means for allowing only one of the two movable modules to be moved to a facing position to the fixed module, by restricting the movement of the other movable module; and a determination means for determining the movable module to be moved to the facing position relative to the fixed module based on the predetermined processing. The restriction means is configured to control the operation of the plurality of modules so that, when the processing under cooperation of the fixed module and one of the movable modules determined by the determination means has been completed, the restriction of the movement of the other movable module to the facing position is released.

Preferably, in the machine tool of the present disclosure with the configuration as described above, the determination means is configured to determine the operation of the movable modules according to the execution order of a plurality of operation commands for the processing performed under cooperation of the fixed module and the movable module, as prescribed in a machining program.

Preferably, in the machine tool of the present disclosure with the configuration as described above, the determination means is configured to determine the operation of the movable modules so that: when the fixed module is holding the workpiece, priority is given to the movement of one of the movable modules to transfer the workpiece to a next process step; and when the fixed module is not holding the workpiece, priority is given to the movement of the other movable module to transfer the workpiece to the fixed module.

Advantageous Effect

With the machine tool according to the present disclosure, it is possible to restrict simultaneous movement of two movable modules to positions facing the fixed modules and to control them to move smoothly with respect to the fixed modules.

DETAILED DESCRIPTION

Figure 1:
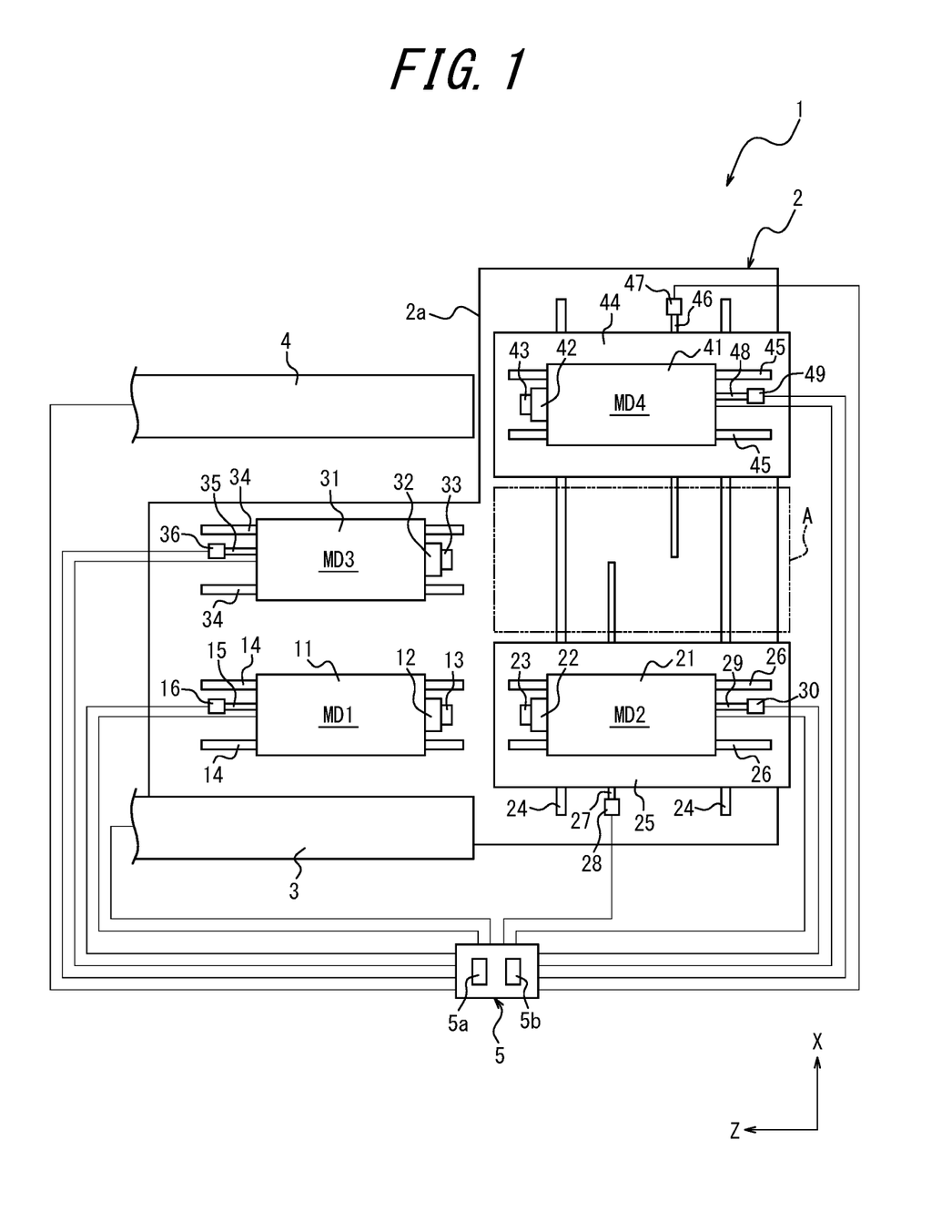
FIG. 1 is an explanatory view schematically illustrating the configuration of the machine tool according to one of the embodiments of the present disclosure.

The machine tool 1 illustrated in FIG. 1 comprises a base 2, and four modules MD1, MD2, MD3, and MD4 arranged on the base 2, for performing predetermined processing on the workpiece. The module MD1 and the module MD3 are arranged in parallel with each other, and the modules MD2 and MD4 are arranged on opposite sides of the modules MD1 and MD3, in parallel with each other.

The module MD1 includes a spindle 12 rotatably supported by a headstock 11. A chuck 13 is provided at the tip of the spindle 12, and the workpiece can be held by the chuck 13. The headstock 11 is provided with a spindle motor in the form of a conventional built-in motor, and the spindle 12 is adapted to be driven by the spindle motor for rotation together with the workpiece held by the chuck 13.

The module MD1 is mounted on the base 2 via a pair of Z-axis guide rails 14 that are fixed to the base 2. The Z-axis guide rails 14 extend along the axial direction of the spindle 12, that is, along the Z-axis direction (the first direction), and the module MD1 is guided by the Z-axis guide rails 14 so as to be movable in the Z-axis direction. A conventional ball screw mechanism 15 is provided between the headstock 11 and the base 2. By driving the ball screw mechanism 15 by means of a drive source 16, such as a servomotor, the module MD1 can be controlled and moved in the Z-axis direction on the base 2. The module MD1 is a fixed module that is movable in the Z-axis direction and immovable in the X-axis direction.

The module MD2 includes a spindle 22 rotatably supported by a headstock 21, and the spindle 22 is arranged in a direction along the Z-axis direction. A chuck 23 is provided at the tip of the spindle 22, and the work can be held by the chuck 23. The headstock 21 is provided with a spindle motor in the form of a conventional built-in motor, and the spindle 22 is adapted to be driven by the spindle motor for rotation together with the workpiece held by the chuck 23.

The module MD2 is mounted on the movable base 25 via a pair of Z-axis guide rails 26, and the movable base 25 is mounted on the pair of X-axis guide rails 24 that are fixed to the base 2. The X-axis guide rails 24 extend along the horizontal direction orthogonal to the Z-axis direction, that is, along the X-axis direction (the second direction), and the module MD2 is guided by the X-axis guide rails 24 so as to be movable in the X-axis direction together with the movable table 25. A conventional ball screw mechanism 27 is provided between the moving table 25 and the base 2. By driving the ball screw mechanism 27 by means of a drive source 28, such as a servomotor, the module MD2 can be controlled and moved in the X-axis direction on the base 2.

The Z-axis guide rails 26 extend along the Z-axis direction, and the module MD2 can be moved in the Z-axis direction, in addition to the X-axis direction, as being guided by the Z-axis guide rails 26. A conventional ball screw mechanism 29 is provided between the headstock 21 and the moving base 25. By driving the ball screw mechanism 29 by means of a drive source 30, such as a servomotor, the module MD2 can be controlled and moved in the Z-axis direction on the moving base 25. The module MD2 is a movable module that is movable in the X-axis direction, in addition to the Z-axis direction.

The module MD3 includes a spindle 32 rotatably supported by a headstock 31, and the spindle 32 is arranged in a direction along the Z-axis direction. A chuck 33 is provided at the tip of the spindle 32, and the work can be held by the chuck 33. The headstock 31 is provided with a spindle motor in the form of a conventional built-in motor, and the spindle 32 is adapted to be driven by the spindle motor for rotation together with the workpiece held by the chuck 33.

The module MD3 is mounted on the base 2 via a pair of Z-axis guide rails 34 that are fixed to the base 2. The Z-axis guide rails 34 extend along the Z-axis direction, and the module MD3 is guided by the Z-axis guide rails 34 so as to be movable in the Z-axis direction. A conventional ball screw mechanism 35 is provided between the headstock 31 and the base 2. By driving the ball screw mechanism 35 by means a drive source 36, such as a servomotor, the module MD3 can be controlled and moved in the Z-axis direction on the base 2. The module MD3 is a fixed module that is movable in the Z-axis direction and immovable in the X-axis direction.

The module MD4 includes a spindle 42 rotatably supported by a headstock 41, and the spindle 42 is arranged in a direction along the Z-axis direction. A chuck 43 as a work holder means is provided at the tip of the spindle 42, and the work can be held by the chuck 43. The headstock 41 is provided with a spindle motor in the form of a conventional built-in motor, and the spindle 42 is adapted to be driven by the spindle motor for rotation is together with the workpiece held by the chuck 43.

The module MD4 is mounted on a movable base 44 via a pair of Z-axis guide rails 45, and the movable table 44, in turn, is mounted on the pair of X-axis guide rails 24 shared with the module MD2. The module MD4 is guided by the X-axis guide rail 24 so as to be movable in the X-axis direction together with the movable base 44. A conventional ball screw mechanism 46 is provided between the movable table 44 and the base 2. By driving the ball screw mechanism 46 by means of a drive source 47, such as a servomotor, the module MD4 can be controlled and is moved in the X-axis direction on the base 2. The Z-axis guide rails 45 extend along the Z-axis direction, and the module MD4 can move in the Z-axis direction, in addition to the X-axis direction, as being guided by the Z-axis guide rails 45. A conventional ball screw mechanism 48 is provided between the headstock 31 and the moving base 44. By driving the ball screw mechanism 48 by means of a drive source 49, such as a servomotor, the module MD4 can be controlled and is moved in the Z-axis direction on the movable base 44. The module MD4 is a movable module that is movable in the X-axis direction, in addition to the Z-axis direction.

The base 2 is partially provided with a notch portion 2a and is formed in a substantially L-shape as seen in a plan view. The X-axis guide rails 24 extend, respectively, in a portion of the base 2 where the notch portion 2a is not provided, from a portion facing the module MD1 and the module MD3 to a portion facing the notch portion 2a.

The module MD2 is movable in the X-axis direction toward the modules MD1 and MD3, between a position facing the module MD1 and a position facing the module MD3. By moving the movable module MD2 in the X-axis direction, the module MD2 can be opposed selectively to either the module MD1 or the module MD3. The module MD4 is movable in the X-axis direction toward the modules MD1 and MD3, between the position facing the module MD3 and the position facing the notch 2a. By moving the module MD4 in the X-axis direction, the module MD4 can be opposed selectively to either the module MD3 or the notch portion 2a. The position where the module MD2 or the module MD4 are opposed to the module MD3 (indicated by a two-dot chain line in FIG. 1) is the facing position A where both the module MD2 and the module MD4 are movable.

The module MD1 can receive the workpiece to be processed from the workpiece supply section 3. The module MD2 is adapted to receive the workpiece from the module MD1 and transfer the workpiece to the module MD3. The module MD4 is adapted to receive the workpiece from the module MD3 and transfer the workpiece from the work unloading section 4 for the next process step.

The modules MD1, MD2, MD3, MD4 are adapted to hold the received workpiece by means of the chucks 13, 23, 33 and 43, and process the workpiece by the tool of the tool stand provided for each module. By moving the modules MD1, MD2, MD3, MD4, respectively, it is possible to process the workpieces held by the chucks 13, 23, 33 and 43 by means of the tools of the tool base provided on the base 2.

The modules MD1, MD2, MD3, MD4 serve to receive the workpiece, and hold the received workpiece on the chucks 13, 23, 33 and 43 to perform predetermined processing on the workpieces, and then to subject the workpieces to predetermined processing, such as transfer to the next process step.

The machine tool 1 includes a control means in the form of a control unit 5. The control unit 5 is comprised of a microcomputer provided with a CPU (central processing unit) and a storage means, such as a memory, and a processing program is stored in the storage means.

The control unit 5 is connected to the modules MD1, MD2, MD3, MD4, the drive sources 16, 28, 30, 36, 47, 49, the workpiece supply section 3 and the workpiece unloading section 4, and configured so that, when the workpiece supplied from the workpiece supply section 3 is sequentially transferred between the modules MD1, MD2, MD3, MD4 and subjected to respectively predetermined processing before being unloaded from the workpiece unloading section 4 according to the machining program, the operation of the drive sources 16, 28, 30, 36, 47, 49, the workpiece supply section 3 and the workpiece unloading section 4 can be integratedly controlled.

The control unit 5 as its function includes a restriction means 5a and a determination means 5b. The restriction means 5a serves to control the movement of the movable modules MD2 and MD4 so that only one of the modules MD2 and MD4 is moved to the facing position A of the fixed module MD3, by restricting the movement of the other of the modules MD2 and MD4. The determination means 5b serves to determine which of the modules MD2 and MD4 is to be moved to the facing position A of the module MD3, based on the predetermined processing to be performed by the modules MD1, MD2, MD3, MD4.

With the control unit 5 having the above functions, the operation of the modules MD1, MD2, MD3, MD4, the drive sources 16, 28, 30, 36, 47, 49, the workpiece supply section 3 and the workpiece unloading section 4 can be controlled so as to simultaneously perform a plurality of predetermined operations by the modules MD1, MD2, MD3, MD4 in parallel. In the machine tool 1 with the above configuration, the control unit 5 controls operation of the modules MD1, MD2, MD3, MD4, in consideration that the module MD2 and the module MD4 are both movable modules that can be moved to the facing position A of the module MD3, such that the determination means 5b serves to determine, based on the predetermined processing to be performed by each MD1, MD2, MD3, MD4, which of the modules MD2 and MD4 is to be moved to the facing position A. and the restriction means 5a serves to allow only one of the modules MD2 and MD4, as selected through such determination, to be moved to the facing position A, while restricting the movement of the other module MD2 or MD4 that has not been selected.

For example, when a plurality of processing performed by the modules MD1, MD2, MD3, MD4 are to be simultaneously performed in parallel, such as when the processing performed under the cooperation of the modules MD3 and MD2 and the processing performed under the cooperation of the modules MD3 and MD4 are to be simultaneously performed in parallel, it may happen that the module MD2 and the module MD4 both receive the movement command from the control unit 5 for movinge to the facing positions A of the module MD3.

On the other hand, the control unit 5 operates such that the determination means 5b determines the movable module to be moved to the facing position A (i.e., the module MD2 or MD4), and the restriction means 5a controls the operation of the module MD2 and MD4 by allowing one of the modules MD2 or MD4, which has been selected through the determination, to be moved to the facing position A while restricting the movement of the other of the modules MD2 or MD4 to the facing position A, thereby preventing the modules MD2 and MD4 from being simultaneously moved to the facing position A of the module MD3.

Figure 2:
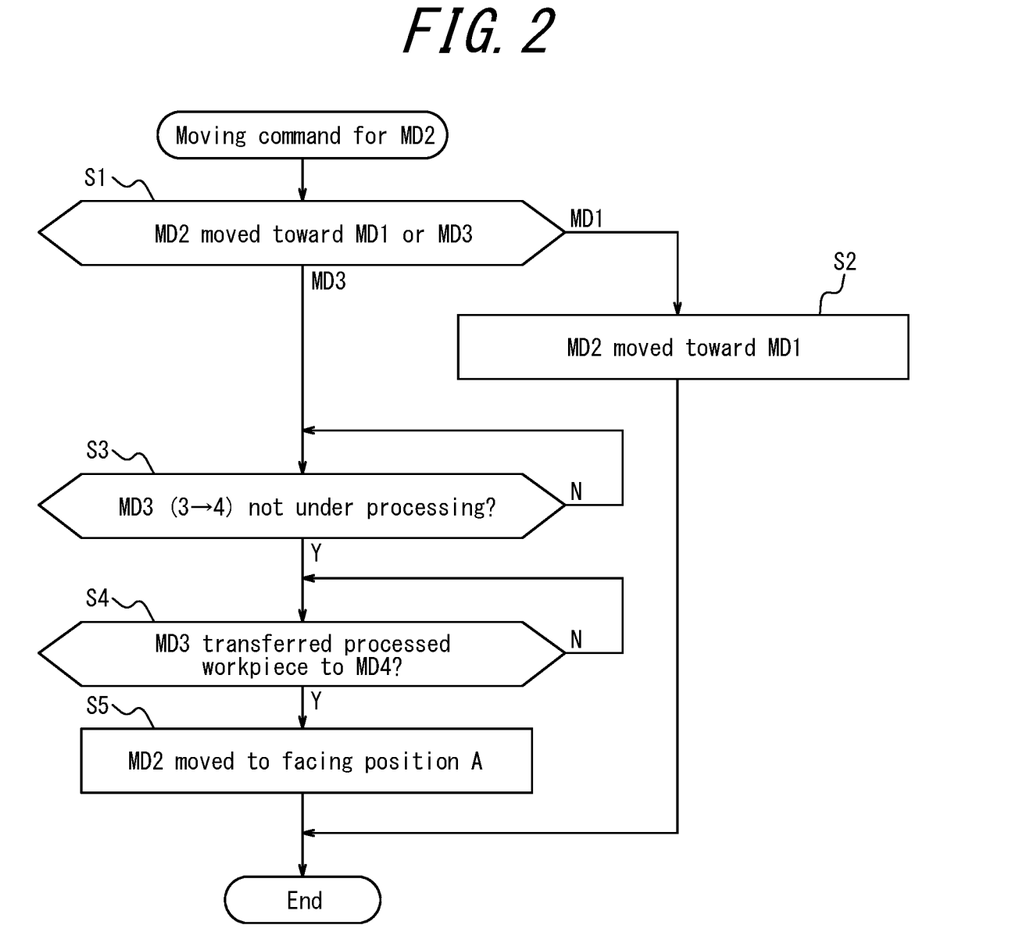
FIG. 2 is a flowchart of the movement command at the time of moving the module MD2.

The processing may be programmed in advance such as to proceed along the process steps wherein the workpiece is transferred from the module MD1 to the module MD2, the workpiece of the module MD2 is transferred to the module MD3, and the workpiece of the module MD3 is transferred to the module MD4. In this instance, when the control unit 5 receives a command for moving the module MD2 in the X-axis direction, as illustrated in FIG. 2, the control unit 5 first determined in step S1 whether the module MD2 is to be moved toward the module MD1 or toward the module MD3, based on the to the position of the movement destination according to the movement command. Here, the movement toward the module MD1 means that the module MD2 is movable from the position facing the module MD3 to the position facing the module MD1, and the movement toward the module MD3 means that the module MD2 is movable from the position facing the module MD1 to the position facing the module MD3.

Figure 3A:
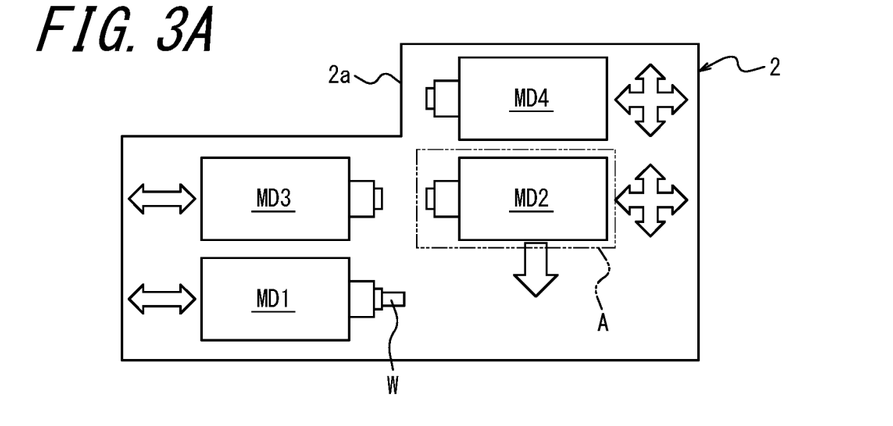
FIGS. 3A-3C are schematic views illustrating the process step pattern when the module MD2 is moved toward the module MD3, respectively.

As illustrated in FIG. 3A, when the module MD2 is to be moved toward the module MD1, the module MD2 is allowed to be moved toward the module MD1 in step S1, and the module MD2 is moved toward the module MD1 in step S2.

When it is determined in step S1 that the module MD2 is to be moved toward the module MD3, the determination means 5b determines in step S3, whether or not the module MD3 is under machining according to the program block being executed by the module MD3. If the program block being executed by the module MD3 is the processing of the processing program, it is determined that the processing is being carried out. If the module MD3 is under processing, the workpiece W to be transferred to the module MD4 is being machined at the module MD3 and the next process step is the transfer of the workpiece to the module MD4. Thus, if the module MD3 is under processing wherein the workpiece W to be transferred to the module MD4 is being machined at the module MD3, the determination means 5b determines that the module MD3 is holding the workpiece, and that the module MD4 is the movable module given priority to move to the facing position A, the process is returned to step S3 and the determination in step S3 is repeated until the machining at the module MD3 is completed.

Figure 3B:
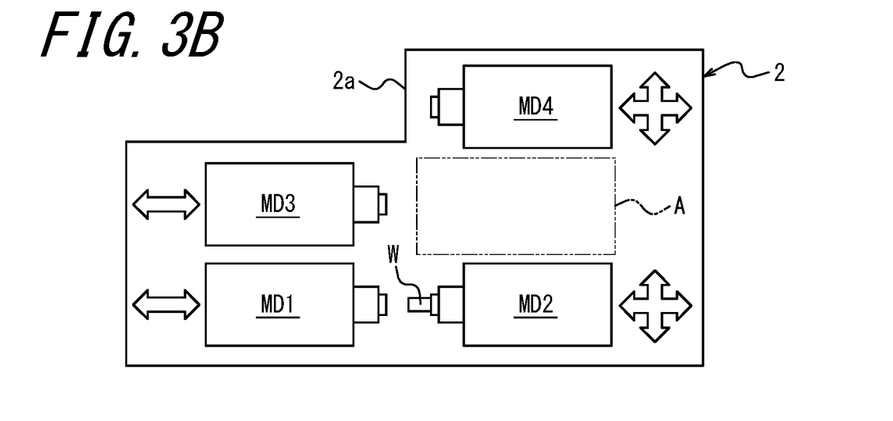

In step S3, as illustrated in FIG. 3B, if the determination means 5b determines that the module MD3 is not under machining, then in step S4, the determination means 5b determines whether the module MD3 has transferred the processed workpiece to the module MD4. If the program block being executed by the module MD3 is the transfer step of the workpiece W between the modules MD3 and MD4, it is determined that the workpiece W has not been transferred, and if the transfer process is completed, it is determined that transfer of the workpiece W has been completed.

If the processed workpiece W has not been transferred from the module MD3 to the module MD4, the next process step is the transfer of the processed workpiece W to the module MD4. Thus, the determination means 5b determines that the module MD3 is holding the workpiece W and that the module MD4 is the movable module given priority to move to the facing position A, the process is returned to step S4 and the determination in step S4 is repeated until the transfer of the workpiece W has been completed. By repeating the determination in steps S3 and S4, the restriction means 5a restricts the movement of the module MD2 to the facing position A, which module has not been selected through the determination as the movable module to be moved to the facing position A.

Figure 3C:
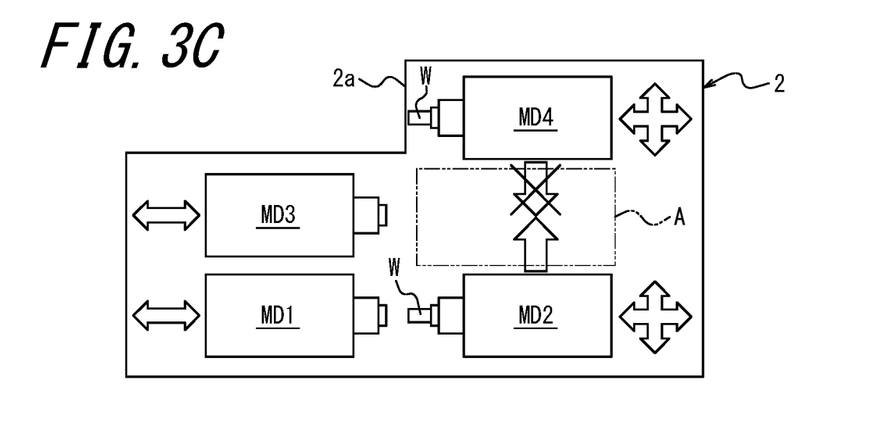

When transfer of the processed workpiece W from the module MD3 to the module MD4 has been completed, as illustrated in FIG. 3C, the module MD4 is moved to the position facing the notch 2a in order to unload the workpiece W from the workpiece unloading section 4 so that the next process step is the transfer, to the module MD3, of the workpiece W held by the module MD2. Thus, the determination means 5b determines that the module MD3 is not holding the workpiece W and that the module MD2 is the movable module given priority to move to the facing position A, to release the restriction on the movement of the module MD2 to the facing position A and allow the movement to the facing position A, whereby the module MD2 is moved to the facing position A in step S5.

Figure 4:
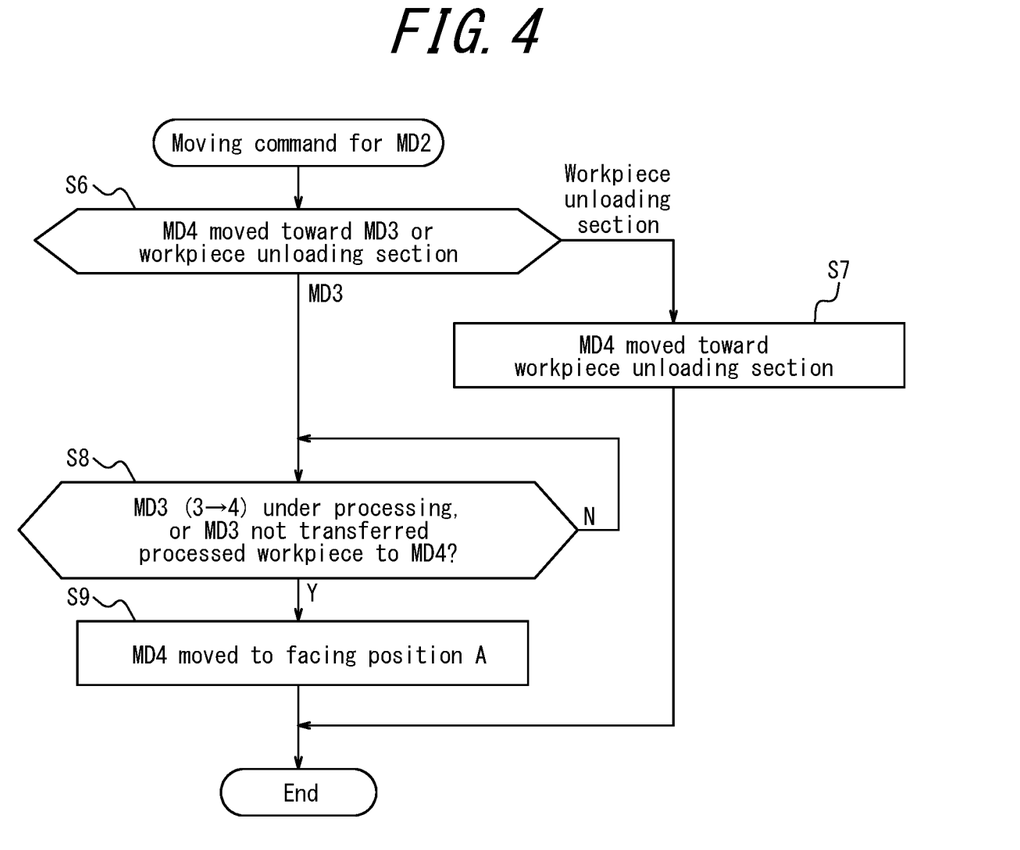
FIG. 4 is a flowchart of the movement command at the time of moving the module MD4.

When processing is carried out along the process steps such that the workpiece is transferred from the module MD1 to the module MD4 via the modules MD2 and MD3 as described above, if the control unit 5 receives a command for moving the module MD4 in the X-axis direction, then, as illustrated in FIG. 4, the control unit 5 first determines in step S6 whether the module MD4 is to be moved toward the module MD3 or toward the workpiece unloading section 4, depending upon the position of the movement destination according to the movement command. Here, the movement toward the module MD3 means that the module MD4 is movable from the position facing the notch 2a to the position facing the module MD3, and the movement toward the workpiece unloading section 4 means that the module MD4 is movable from the position facing the module MD3 toward the position facing the notch 2a.

Figure 5A:
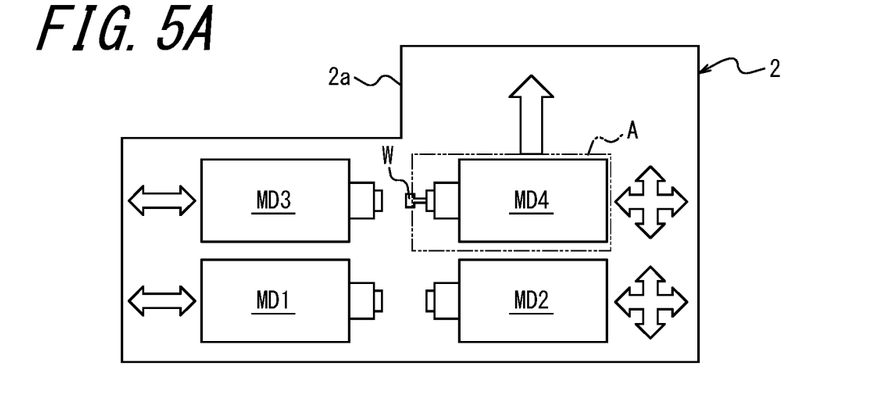
FIGS. 5A-5C are schematic views illustrating the process step pattern when the module MD4 is moved toward the module MD3, respectively.

As illustrated in FIG. 5A, when the module MD4 is to be moved to the position facing the notch 2a as the movement toward the workpiece unloading section 4, the module MD4 is allowed to move to the notch 2a in step S6, and the module MD4 is moved to the notch 2a in step S7.

Figure 5B:
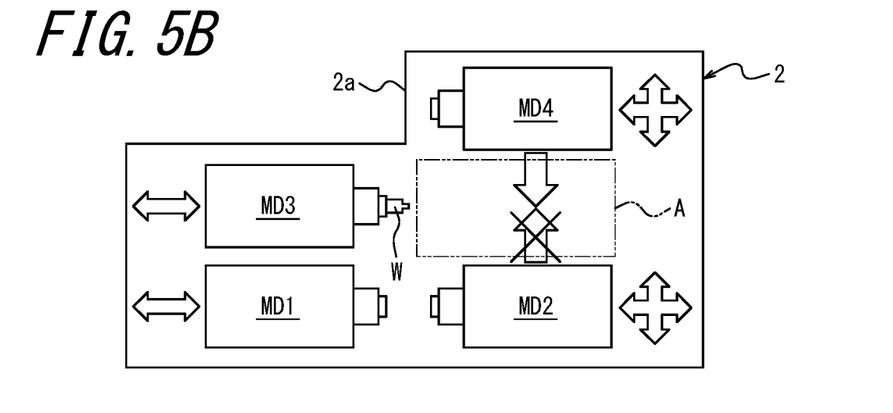
Figure 5C:
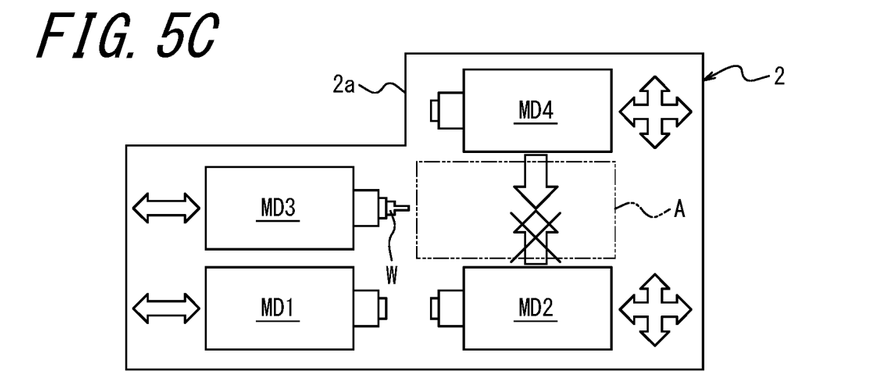

In step S6, if it is determined that the module MD4 is to be moved toward the module MD3, the determination means 5b responds to the program block being executed by the module MD3 in step S8, and it is determined whether the module MD3 is under processing, as illustrated in FIG. 5B, or whether the module MD3 has not transferred the processed workpiece W, as illustrated in FIG. 5C.

In step S8, if the determination means 5b determines that the module MD3 is not under processing and the module MD3 has completed transfer of the processed workpiece W, then the determination means 5b determines that the module MD2 is the movable module to be given priority to move to the facing position A, and the process is returned to step S8, and the determination in step S8 is repeated until the determination means 5b determines that the module MD3 is under processing or that the module MD3 has not transferred to processed workpiece W. By repeating the determination in step S8, the restriction means 5a restricts the movement of the module MD4 to the facing position A, which module has not been selected as the movable module to be moved to the facing position A in the above determination.

In step S8, if it is determined by the determination means 5b that the module MD3 is under processing or that the module MD3 has not completed transfer of the processed workpiece W, then the determination means 5b determines that the module MD3 is holding the workpiece W and that the module MD4 is the movable module to be given priority to move to the facing position A, thereby releasing the restriction on the movement of the module MD4 to the facing position A to allow the movement to the facing position A. Thus, in step S9, the module MD4 is moved to the facing position A.

In this way, the determination means 5b selects one of the modules MD2 or MD4 as the movable module to be given priority for moving toward the facing position A and determines whether or not the module MD3 is holding the workpiece W, while the restriction means 5a restricts the movement of the other of the module MD2 or MD4 from moving to the facing position A, thereby preventing the modules MD2 and MD4 from being simultaneously moved to the facing position A of the module MD3, and allowing the modules MD2 and MD4 to be sequentially moved toward the facing position A for processing.

When the processing at the facing position A has been completed with respect to one of the modules MD2 or MD4 that has been selected by the determination means 5b and given priority for moving to the facing position A, the restriction means 5a releases restriction of movement, to the other facing position A, of the other of the modules MD2 or MD4 that has not been selected through the above determination. As a result, the modules MD2 and MD4 are prevented from interfering with each other at the facing position A, and the module MD2 or MD4, of which the movement to the facing position A has been released from restriction, can be moved to the facing position A based on the movement command described in the processing program.

As described above, the modules MD2 and MD4 can be prevented from interfering with each other at the facing position A and smoothly moved to the position facing the module MD3, and the workpiece W can be efficiently transferred from the upstream side of the processing (e.g., the module MD1) to the downstream side (e.g., the module MD4) for processing.

Furthermore, as described above, since the interference between the modules MD2 and MD4 with each other can be prevented, it is possible to create a processing program for controlling the operation of each module MD1 to MD4, without taking into consideration the mechanical restrictions on the interference, thereby allowing the modules MD2 and MD4 to be efficiently moved to the positions facing the module MD3.

The present disclosure is not limited to the embodiment described above, and various changes may be made without departing from the technical scope as defined by the appended claims.

For example, when the processing program stored in the storage means describes two operation commands, i.e., the operation command for the operation carried out under cooperation between the modules MD3 and MD2 and the operation command for the operation carried out under cooperation between the modules MD3 and MD4, the determination means 5b determines the movable module (module MD2 or MD4) to be moved to the facing position A of the module MD3, in accordance with the execution sequence on the processing program of the operation commands and for executing at first the operation command described earlier on the processing program. Then, for allowing only one movable module (modules MD2, MD4) to be moved to the facing position A of the module MD3, the restriction means 5a restricts the movement of the other of the movable modules (module MD2, MD4), thereby making it possible to control the operation of the modules MD1, MD2, MD3 and MD4 based on the above determination.

In the embodiment of the present disclosure, the base 2 is provided with the module MD1 which is immovable in the X-axis direction, in parallel with the module MD3 which is a fixed module. However, an alternative configuration is also possible wherein the module MD1 is not provided.

In the embodiment of the present disclosure, explanation has been given with respect to an example wherein the processing is started with the module MD1 as the upstream side of processing and ended with the module MD4 as the downstream side of processing. Conversely, however, the processing may be started with the module MD4 as the upstream side of processing and ended with the module MD1 as the downstream side of processing.

In the embodiment of the present disclosure, the processing is started from the module MD1 by way of example. However, the workpiece supply section may be installed next to the module MD3 so as to start the processing from the module MD3. On such occasion, it is possible to apply the steps following the step S3 in FIG. 2 and the steps following the step S8 in FIG. 4, based on determination of whether or not the module MD3 is holding the workpiece and depending upon the flow direction of the process steps.

REFERENCE SIGNS LIST

1 Machine tool
2 Base
2a Notch
3 Workpiece supply section
4 Workpiece unloading section
5 Control section
5a Restriction means
5b Determination means
11 Headstock
12 Spindle
13 Chuck
14 Z-axis guide rail
15 Ball screw mechanism
16 Drive source
21 Headstock
22 Spindle
23 Chuck (workpiece holder means)
24 X-axis guide rail
25 Moving table
26 Z-axis guide rail
27 Ball screw mechanism
28 Drive source
29 Ball screw mechanism
30 Drive source
31 Headstock
32 Spindle
33 Chuck (workpiece holder means)
34 Z-axis guide rail
35 Ball screw mechanism
36 Drive source
41 Headstock
42 Spindle
43 Chuck (workpiece holder means)
44 Movable table
45 Z-axis guide rail
46 Ball screw mechanism
47 Drive source
48 Ball screw mechanism
49 Drive source
MD1 Module MD2 Module (movable module)
MD3 Module (fixed module)
MD4 Module (movable module)
A Facing position
W Workpiece.

The invention claimed is:

1. A machined tool comprising:
a plurality of modules, having a workpiece holder means for holding a workpiece, for performing a predetermined processing on the workpiece; and
a control unit for controlling the predetermined processing of the plurality of the modules, wherein
the predetermined processing includes receiving the workpiece, holding the workpiece on the workpiece holder means, processing the workpiece by a tool of a tool stand, and transferring the workpiece to a next process step,
the plurality of the modules comprises:
a first module that is movable in a first direction and is immovable in a second direction orthogonal to the first direction; and
two second modules that are movable in the first direction and the second direction and are located at a same side opposite to the fixed module in the first direction, wherein the two second modules have a respective longitudinal axis, the longitudinal axes of the two second modules being parallel to each other along the first direction,
the control unit is configured to determine, based on the predetermined processing, one of the two second modules to be moved to a facing position where the one of the two second modules faces the first module in the first direction, allow only the one of the two second modules to be moved to the facing position the fixed module, by restricting, and restrict a movement of the other one of the two second modules, and
the control unit is further configured to control movements of the plurality of the modules so that, when each of the two second modules receives a movement command from the control unit for moving to the facing position and the predetermined processing under cooperation of the first module and the one of the two second modules has been completed, restriction of the movement of the other one of the two second modules to the facing position is released.

2. The machine tool according to claim 1, wherein the control unit is further configured to determine the one of the two second modules according to an execution order of a plurality of operation commands for the predetermined processing performed under the cooperation of the first module and the two second modules, as prescribed in a machining program.

3. The machine tool according to claim 1, wherein
the one of the two second modules is configured to transfer the workpiece to the next process step and the other one of the two second modules is configured to transfer the workpiece to the first module, and
the control unit is further configured to determine the one of the two second modules so that:
when the workpiece holder means of the first module is holding the workpiece, priority is given to a movement of the one of the two second modules; and
when the workpiece holder means of the first module is not holding the workpiece, priority is given to a movement of the other one of the two second modules.

* * * * *